(12) United States Patent
Fu et al.

(10) Patent No.: US 7,697,690 B2
(45) Date of Patent: Apr. 13, 2010

(54) WINDOWED BACKWARD KEY ROTATION

(75) Inventors: Kevin E. Fu, Cambridge, MA (US); Mahesh Kallahalla, Palo Alto, CA (US); Ram Swaminathan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1989 days.

(21) Appl. No.: 10/624,403

(22) Filed: Jul. 21, 2003

(65) Prior Publication Data

US 2005/0018842 A1    Jan. 27, 2005

(51) Int. Cl.
*H04L 9/00* (2006.01)
*H04N 7/167* (2006.01)
*H04L 9/32* (2006.01)
*G06F 21/00* (2006.01)

(52) U.S. Cl. .......................... 380/277; 380/44; 380/45; 380/239; 380/240; 713/170; 713/182; 713/189; 705/51; 705/52

(58) Field of Classification Search ................ 713/189; 380/44; 705/52
See application file for complete search history.

(56) References Cited

U.S. PATENT DOCUMENTS

| | | | |
|---|---|---|---|
| 5,875,247 A * | 2/1999 | Nakashima et al. ........... 705/52 |
| 6,363,149 B1 * | 3/2002 | Candelore .................... 380/45 |
| 6,381,699 B2 | 4/2002 | Kocher et al. |
| 6,941,457 B1 | 9/2005 | Gundavelli et al. |
| 7,013,389 B1 | 3/2006 | Srivastava et al. |
| 7,068,786 B1 * | 6/2006 | Graunke et al. ............... 380/44 |
| 7,203,317 B2 | 4/2007 | Kallahalla |
| 7,313,238 B2 | 12/2007 | Fu et al. |
| 2001/0002486 A1 | 5/2001 | Kocher et al. |
| 2002/0152392 A1 * | 10/2002 | Hardy et al. ................ 713/189 |
| 2003/0044020 A1 | 3/2003 | Aboba et al. |
| 2003/0068047 A1 | 4/2003 | Lee et al. |
| 2003/0081787 A1 | 5/2003 | Kallahalla et al. |
| 2003/0142826 A1 | 7/2003 | Asano |
| 2003/0191956 A1 | 10/2003 | Ishiguro et al. |
| 2004/0017916 A1 | 1/2004 | Staddon et al. |
| 2004/0101138 A1 | 5/2004 | Revital et al. |
| 2004/0114762 A1 | 6/2004 | Medvinsky |

OTHER PUBLICATIONS

M. Noar and B. Pinkas, Efficient Trace and Revoke Schemes in Proceedings of Financial Cryptography, Feb. 2000, pp. 1-24.

D. Naor, M. Naor, and J. Lotspiech, Revocation and tracing schemes for stateless receivers, in Advances in Cryptology—CRYPTO 2001, LNCS 2139, pp. 1-34.

Jessica Staddon, et al "Self-Healing Key Distribution with Revocation"; 2002 IEEE Symposium on Security and Privacy (S&P'02).

(Continued)

*Primary Examiner*—Shin-Hon Chen

(57) ABSTRACT

Windowed backward key rotation. A user is provided information that allows determining a limited number of previous keys in a series of keys from a later key in the series. A key in the series is generated, based at least in part on the information provided to the user. The key in the series is provided to the user. The user determines at least one key in the limited number of previous keys in the series by applying the information to the key in the series.

18 Claims, 6 Drawing Sheets

OTHER PUBLICATIONS

K.E. Fu, "Group Sharing and Random Access in Cryptographic Storage File Systems," pp. 1-85 (Jun. 1999).
U.S. Appl. No. 10/355,470, Office Action dated Sep. 6, 2006, pp. 1-8, with attachments.
U.S. Appl. No. 10/355,470, Office Action dated Mar. 2, 2007, pp. 1-10 with attachments.
U.S. Appl. No. 10/355,470, Notice of Allowance dated Oct. 29, 2007, pp. 1-3.

* cited by examiner

500

ID BACKWARD KEY ROTATION

The present application may be related to U.S. application entitled, "Method and System for Relating Cryptographic Keys," application Ser. No. 10/355,470, filed on Jan. 31, 2001, now U.S. Pat. No. 7,313,238.

TECHNICAL FIELD

The present invention relates to the field of cryptographic key management. Specifically, embodiments of the present invention relate to a method of cryptographic key management featuring windowed backward key rotation.

BACKGROUND ART

In a conventional cryptographic file system, the data (or files) are stored encrypted. This is a convenient feature especially if an owner of the files cannot trust the administrator of the server to provide adequate security measures to ensure data privacy. To make the conventional cryptographic file system more user-friendly, users typically try to minimize the number of cryptographic keys used to encrypt the files. Otherwise, the number of cryptographic keys may be equal to the number of files that the owner/user may have on the cryptographic keys, which may make managing the cryptographic keys burdensome, and thereby making the cryptographic file system less user-friendly.

In some cases, users share files in a cryptographic file system by having a copy of the encrypted file and an associated decryption key. In this manner, a user may utilize the associated decryption key to decrypt the received encrypted file for access to the file. However, in some instances, an owner of a file may attempt to prevent a previously authorized user from future access to the file, i.e., revoke a user.

One method for revoking a user is to re-encrypt all the files of the owner with a new cryptographic key. However, re-encrypting all the files is a time-consuming and burdensome task, especially if the owner has encrypted a number of files with the same cryptographic key.

In general, other conventional secure file systems that provide revocation rely on the server checking for user's group membership before granting access. This particular trait requires the servers to store (or cache) information regarding users, which places a high trust requirement on the servers and requires all the servers to maintain this authentication information in a secure and consistent manner.

Other conventional techniques securely send every key update to the user, such that the user is able to decrypt files encrypted with various versions of the key. Unfortunately, the user may fail to receive one or more of the keys. This may be due to the owner being unable to achieve a secure connection to the user when the key updates are provided or simply due to a failure in transferring the new key. In this case, the user is unable to decrypt files for which he lacks the proper key.

Thus, one problem with some conventional methods and systems for providing cryptographic key management is that all of the files need to be re-encrypted with the new key, whenever a new key is needed. Another problem with some conventional methods and systems for providing cryptographic key management is that the user is unable to decrypt files because a new key was not received.

DISCLOSURE OF THE INVENTION

The present invention pertains to a method of windowed backward key generation. In one embodiment, a user is provided information that allows determining a limited number of previous keys in a series of keys from a later key in the series. A key in the series is generated, based at least in part on the information provided to the user. The key in the series is provided to the user. The user determines at least one key in the limited number of previous keys in the series by applying the information to the key in the series that was provided to the user.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
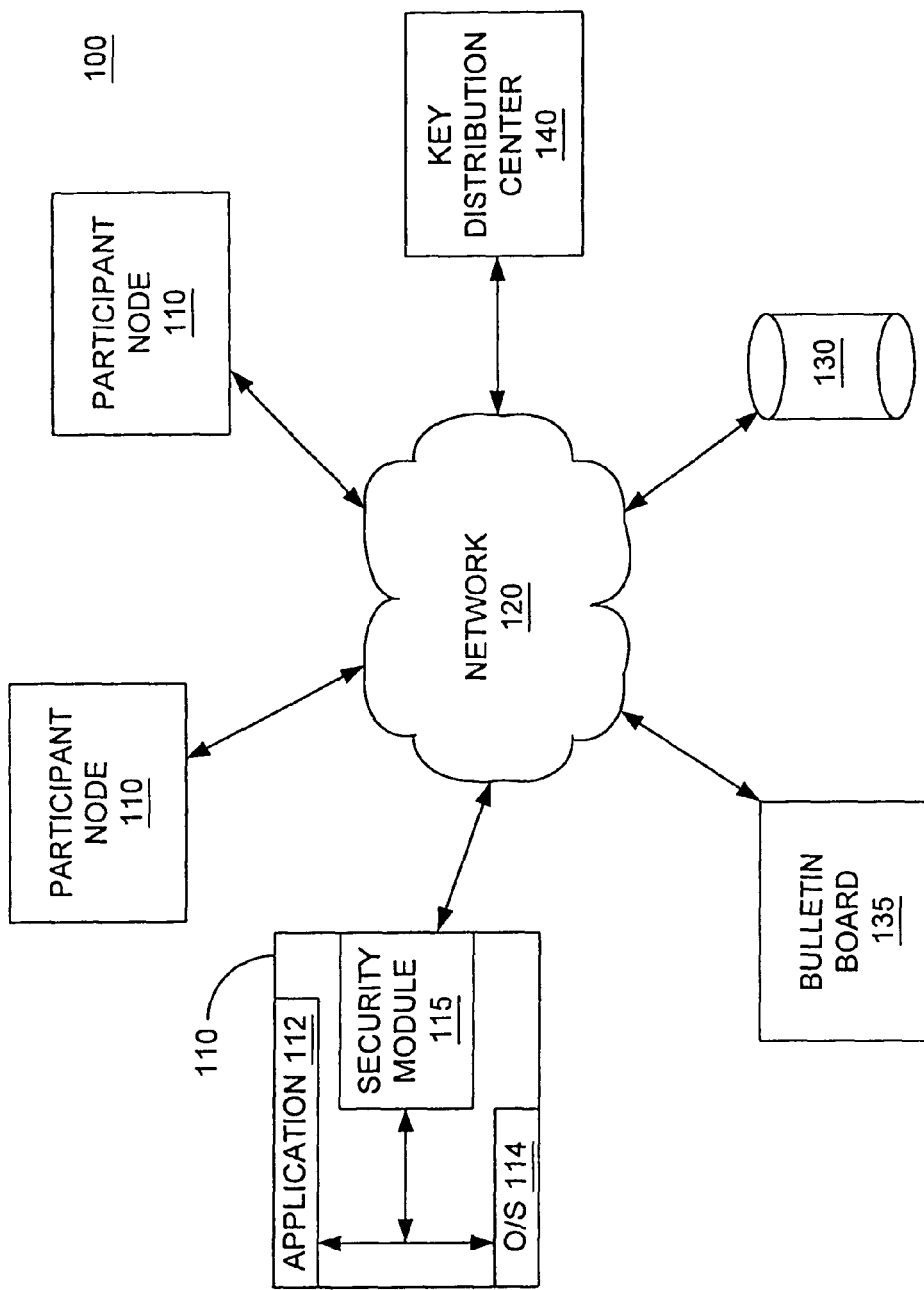
FIG. 1 illustrates a block diagram of a cryptographic key system in which embodiment the present invention may be practiced.

In the following detailed description of embodiments of the present invention, a method of windowed backward key generation, numerous specific details are set forth in order to provide a thorough understanding of the present invention. However, embodiments of the present invention may be practiced without these specific details or by using alternative elements or methods. In other instances well known methods, procedures, components, and circuits have not been described in detail as not to unnecessarily obscure aspects of the present invention.

Embodiments of the present invention are used in a system in which new cryptographic keys are generated from time to time. For example, when a user is revoked from access to the files that are decryptable by one of the cryptographic keys, a new cryptographic key is generated and provided to the non-revoked users. Thus, over time, a series of cryptographic keys are generated and different files in the system may be encrypted by a different version of the cryptographic key. Moreover, it may be that one of the users does not have one of the cryptographic keys for some reason. For example, that user may not have had a secure connection to the key distribution locale at the time the key was provided to the other users. In accordance with the principles of embodiments of the present invention, a user is able to determine a limited number of previous versions of the cryptographic key. For example, the user can determine previous cryptographic keys only so far back as the cryptographic key that was the current cryptographic key at the time the user joined. Thus, the user cannot obtain cryptographic keys that were used to encrypt files before the user joined.

In some embodiments of the present invention, the users receive key updates in a non-interactive fashion. However, the present invention is not limited to non-interactive key updates. In an embodiment using non-interactive key updates, a new cryptographic key may be determined by the users without interacting directly with the owner. For example, the owner publishes information that allows the users to determine the new cryptographic key, provided the user has sufficient other information. It is extremely difficult for the users to generate the new cryptographic key without this information. However, using this information, a user can construct the new cryptographic key without directly communicating with the owner.

Thus, embodiments of the present invention provide cryptographic keys in which it is not necessary to re-encrypt all the files with the new cryptographic key whenever a new cryptographic key is needed for future file encryption. For example, when a user is revoked a new cryptographic file key is used to encrypt future versions of files. Embodiments in accordance with the present invention allow a limited number of previous versions of a key to be generated from more recent versions of the cryptographic key. Embodiments in accordance with the present invention allow a user to generate a new cryptographic key without direct interaction with the cryptographic key owner.

FIG. 1 is a block diagram of a system 100 in which embodiments of the present invention may be practiced. The system 100 includes participant nodes 110 connected to a network 120, and a shared file system 130. Each of the participant nodes 110 may have their own files as well. Furthermore, the system 100 may have a bulletin board 135, which is used to post public shares to be used in cryptographic key management.

The participant nodes 110 of the system 100 may be configured to provide access to or receive computer software applications and/or data. Thus, a participant node 110 may be an owner and/or a user. The participant nodes 110 may be implemented by a personal computer, a laptop computer, a workstation, a portable wireless device, and other similar computing devices. Each participant node 110 may include an application 112, an operating system 114, and a security module 115. FIG. 1 illustrates an exemplary embodiment of the architecture for the participant node 110; however, it should be readily apparent to those of ordinary skill in the art that FIG. 1 represents a generalized schematic illustration of the participant node 110 and that other components may be added or existing components may be removed without departing from the spirit or scope of the present invention.

The application 112 may be a computer software program that is executed on the participant node 110. The application 112 may be a word processing program, a spreadsheet program, a shell program, or any other type of program that accesses files stored in the shared file system 130. The application 112 may interface with the operating system 114 through an application program interface (API, not shown). The operating system 114 may be configured to manage the software applications, data and respective hardware components (e.g., displays, disk drives, etc.) of the participant node 110. The operating system 114 of the participant node 110 may be configured to interface with the security module 115.

The security module 115 may be configured to perform various key management tasks. When functioning as an owner, this may include generating an initial cryptographic key, which is securely distributed to valid (e.g., authorized) participant nodes 110. The security module 115 may also generate a new cryptographic key based on a version of a previous cryptographic key. The security module 115 may also generate a windowed key rotation exponent. The users are able to determine later versions of the windowed key rotation exponent from earlier versions. However, it is extremely difficult for a user to determine an earlier version of the windowed key rotation exponent. The windowed key rotation exponent allows a participant node 110 to determine previous versions of the key.

In some embodiments, this new cryptographic key is not distributed to participant nodes 110. To allow the participant nodes 110 to determine the new cryptographic key in a non-interactive fashion, the security module 115 may also generate and securely distribute to valid participant nodes 110 private shares that are related to the cryptographic key. Further, the security module 115 may also publish a key rotation catalyst and public share information on the bulletin board 135 or elsewhere. A given participant node 110 is able to generate the new cryptographic key based on the old cryptographic key, the participant node's 110 private share, the public share(s), and the key rotation catalyst. In this fashion, the user participant node 110 does not need to directly contact the owner participant node 110 to receive a cryptographic key update. However, the present invention is not limited to non-interactive key updates as described in this paragraph.

The security module 115 may also be configured to recursively generate a limited number of cryptographic keys. For example, when functioning as a user node, the security module 115 may be configured to generate a limited number of previous versions of the cryptographic key based on later cryptographic keys and the windowed key rotation exponent. This process may be referred to as rotating the cryptographic key backwards, and is "windowed" in that the user is limited as to how far back the cryptographic key may be rotated. Moreover, a cryptographic key may not be rotated forward by the user, other than the embodiments in which the user determines one new key non-interactively. The security module 115 may also be configured to attach a header file (or metadata) to the encrypted file. The header file may provide the capability for other authorized users to determine which version of the cryptographic key was used to encrypt the file. In this fashion, if a user misses one or more key updates, the user can still decrypt files that were encrypted with a former version of the cryptographic key. However, the user is only allowed to decrypt files that were encrypted with cryptographic keys that were the current cryptographic key between the time the user joined and the time the user is revoked.

Authorized users may use the security module 115 to determine which version of the cryptographic key is necessary to decrypt a given file. The security module 115 may be implemented as a software program, a utility, a subroutine, or other similar programming entity. Alternatively, the security module 115 may be implemented as an electronic device utilizing an application specific integrated circuit, discrete components, solid-state components or combination thereof.

The participant nodes 110 may be further configured to interface with the network 120 through a respective network interface (not shown). The network 120 may be configured to provide a communication channel between each participant node 110 and the shared file system 130. The network 120 may be a wired network (e.g., PSTN, fiber optic, etc.), wireless network (e.g., text messaging, Wireless Application Protocol, etc.), or combination thereof. The network 120 may be further configured to support network protocols such as Transmission Control Protocol/Internet Protocol, IEEE 802.5, Asynchronous Transfer Mode, Cellular Digital Packet Data, MOBITEX™, IEEE 801.11b, and other similar network protocols.

The shared file system 130 may be configured to provide storage of data and/or software applications for the system 100. The shared file system 130 may be a network accessible disk drive and/or array of disks.

Optionally, the system 100 may include a key distribution center 140. The key distribution center 140 may be configured to provide a secure method of transferring the initial cryptographic file key, later cryptographic file keys, the owner's public key, the windowed key rotation exponent, private share information, and other information, such as hash functions, within the system 100.

In accordance with one aspect of the present invention, an owner may revoke user access to a file by utilizing the security module 115. In a cryptographic key owner mode, the security module 115 may be configured to generate a new cryptographic key based on the current cryptographic key and the windowed key rotation exponent. The security module 115 may then utilize the new version of the cryptographic key to encrypt the file for storage on the shared file system 130 or elsewhere. In an embodiment using non-interactive key updates, the security module 115 may be configured to generate a new cryptographic key based on the current cryptographic key, the windowed key rotation exponent, and a key rotation catalyst.

As already stated, an authorized user may utilize the security module 115 to decrypt the encrypted file, and the security module 115 may be configured to determine which version of the cryptographic key was utilized to encrypt a selected file. If the security module 115 determines that the selected file is encrypted with a previous version of the cryptographic key, the security module 115 may be further configured to generate the previous version of the cryptographic key based on the windowed key rotation exponent and the current cryptographic key the authorized user holds. Accordingly, an owner may revoke a user from future versions of files, while still permitting access by authorized users to the files that may not have been updated and are hence encrypted with a previous version of the cryptographic key, back as far as the version of the cryptographic key that was the current key when the user joined. Thus, lazy revocation is enabled in an environment where a server may not be trusted. Moreover, by enabling lazy revocation through recursive key generation, the number of cryptographic keys in the cryptographic system remains minimal since previous versions of cryptographic keys may be generated from later versions by the authorized user while still barring access to unauthorized users.

Initially, the owner may generate various items to setup the cryptographic key management. For example, the owner may generate a public key, a private key, and an initial cryptographic file key.

The public and private keys are not used to encrypt the files, but rather in the cryptographic key management. To generate the owner's public and private keys, the owner may select safe Sophie-Germain primes p, q, $p_1$, $p_2$, where p|q−1 and the minimum ($|\phi(p_1 p_2)|$, $|q|$)=$2^s$, where s is the security parameter and $\phi(p_1 p_2) = (p_1-1)(p_2-1)$. A value "N" may be set to "$p_1 p_2$", the RSA (Rivest-Shamir-Adleman) modulus. A random RSA public key "e" and a private key "d" may be generated according to a conventional fashion where ed≡1 mod $\phi(N)$, and gcd(e, $\phi(N)$)=1. However, the present invention is not limited to this method of calculating the owner's public and private keys. More generally, any other public/ private cryptosystem may be used. Further, rather than using public and private keys, a secure hash function may be used, in which case the owner pre-computes the hash sequence in advance. The initial cryptographic key "$K_0$" may be a random number.

From time to time, the owner generates a new cryptographic key, based on a previous cryptographic key. For example, when a user is revoked, a new key may be generated so that the revoked user is prevented from having any further access. However, files encrypted with old keys may still be decryptable by the revoked user, at least until those files are encrypted with a new version of the cryptographic key. The owner may generate a new cryptographic file key as follows. The owner generates a new cryptographic file key by first generating a new windowed key rotation exponent ($e_{i+1}$) from a previous windowed key rotation exponent ($e_i$). Equation 1 is use to calculate an intermediate value "R". In Equation 1, "H" is a secure one-way function and is applied to the previous windowed key rotation exponent ($e_i$). The number "N" is generated at the initial setup as described above and relates to "$p_1 p_2$" above.

$$R = H(e_i) + \sqrt{N} \quad \text{Equation 1:}$$

Applying a one-way function to the windowed key rotation exponent ($e_i$) allows the user to generate later versions of the windowed key rotation exponent ($e_{i+t}$), where "t" is a positive integer. However, it is extremely difficult for the user to determine previous versions of the windowed key rotation exponent ($e_{i-t}$). In one embodiment, the function "H" is a secure one-way hash function, although the present invention is not limited to applying a hash function to the windowed key rotation exponent.

After calculating "R", the new windowed key rotation exponent ($e_{i+1}$) is determined by taking a prime number greater than "R". In one embodiment, the prime number is the smallest prime number greater than "R". However, the present invention is not limited to using the smallest prime number greater than "R". As discussed below, the users are able to rotate the windowed key rotation exponents forward. The technique used in this paragraph to generate the new windowed key rotation exponent affects the technique the users perform to rotate the windowed key rotation exponents forward. Next a new private key ($d_{i+1}$) is determined according to Equation 2, where "N" is that from above from the initial setup above generated from "$p_1 p_2$".

$$d_{i+1} e_{i+1} \equiv 1 \bmod \phi(N) \quad \text{Equation 2:}$$

The owner then calculates a new cryptographic key as shown in Equation 3.

$$K_{i+1} = K_i^{d_{i+1}} \bmod N \quad \text{Equation 3:}$$

Embodiments of the present invention can be used to recover intermediate keys lost due to a lossy network. Thus, even if one or more versions of the cryptographic keys are not received by a user, that user can reconstruct the missed cryptographic keys. For example, it may be impossible to establish a secure connection to the user when a new version of the cryptographic key is delivered to group members. As long as the user gets a future cryptographic key, the user can work backwards to recreate a limited number of cryptographic keys.

Figure 2:
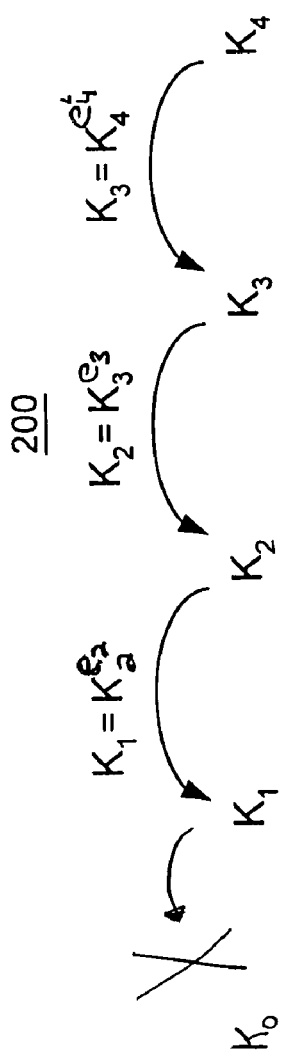
FIG. 2 illustrates an exemplary diagram of a windowed key generation process in accordance with an embodiment of the present invention.

FIG. 2 illustrates an exemplary diagram 200 of a windowed recursive key generation process in accordance with an embodiment of the present invention. As shown in FIG. 2, the user may generate cryptographic key, $K_i$, from $K_{i+1}$ and $e_{i+1}$ by the relationship:

$$K_i = K_{i+1}^{e_{i+1}} \bmod N \quad \text{Equation 4:}$$

Thus, the user can compute a limited number of previous keys according to the formula in Equation 4. The user may also determine later values of the windowed key rotation exponent. To determine $(e_{j+1})$ from $(e_j)$, the user first computes an intermediate value "R", according to Equation 5.

$$R=H(e_j)+\sqrt{N}$$　　　　　　　Equation 5:

The user then determines $(e_{j+1})$ by determining the smallest prime number greater than or equal to "R". This assumes the owner also selected the smallest prime number greater than "R". However, as discussed hereinabove, using the smallest prime number greater than R is not a requirement.

Figure 3B:
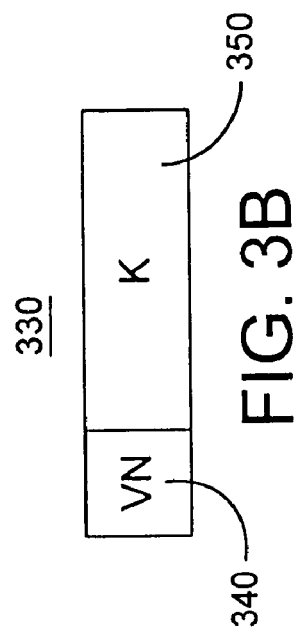
FIG. 3B illustrates a diagram of an exemplary cryptographic key structure utilized by an embodiment of the present invention.
Figure 3A:
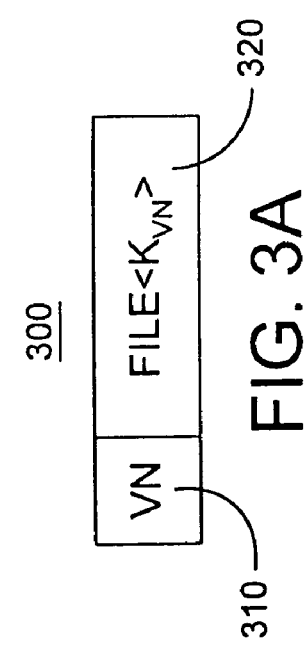
FIG. 3A illustrates a diagram of an exemplary file structure utilized by an embodiment of the present invention.

FIG. 3A illustrates a diagram of an exemplary file data structure 300 utilized by an embodiment of the present invention. As shown in FIG. 3A, the file data structure 300 includes a header portion (or metadata) 310 with an encrypted file 320. The security module 115 may be configured to attach the header portion 310 onto the encrypted file 320 during the encryption process. The header portion 310 may contain information related to the version of the cryptographic key used in the encryption. The header portion 310 may be implemented using a variety of methods such as a bit map.

FIG. 3B illustrates a diagram of an exemplary cryptographic key data structure 330 utilized by an embodiment of the present invention. As shown in FIG. 3B, the cryptographic key data structure 330 may include a header portion (or metadata) 340 with a cryptographic key 350, where the cryptographic key 350 may be used to encrypt a selected file. The header portion 340 may be configured to provide information related to the version of the cryptographic key and the file owner. The header portion 340 may be implemented using a variety of methods such as a bit map, bit fields, etc. The security module 115 may be configured to initialize the header portion 340 to an initial value (e.g., 0 or 1) during the generation of the cryptographic key. For each time a new version of the current cryptographic key is generated, the security module 115 may be configured to increment the value in the header portion 340 by one. The security module 115 may be further configured to add information related to the owner of the file in the header portion 340 during the generation of the cryptographic key.

Figure 4:
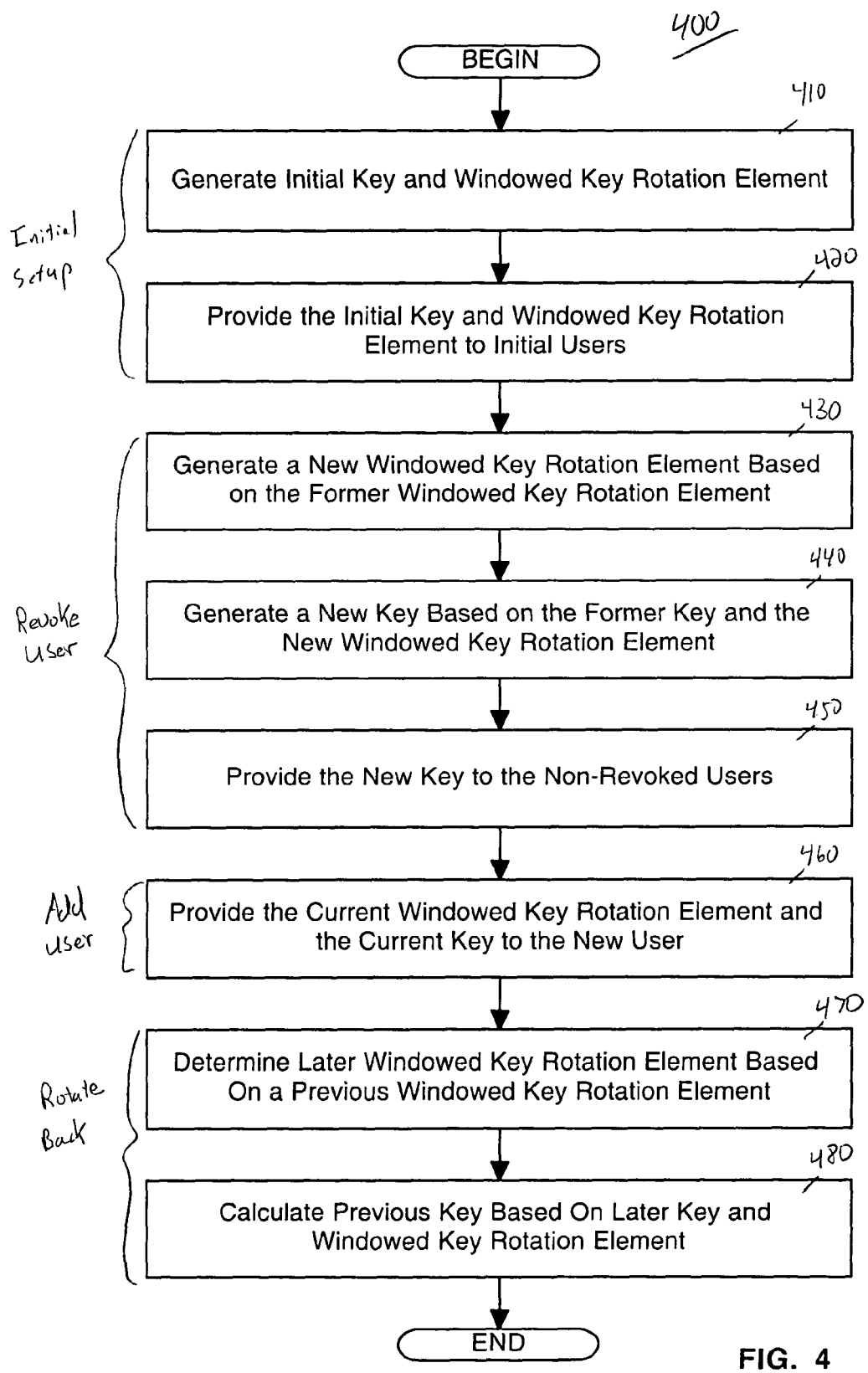
FIG. 4 illustrates steps of a process of windowed backward key generation in accordance with an embodiment of the present invention.

An embodiment of the present invention is a method of windowed backward key rotation. Steps of process 400 of FIG. 4 may be stored as instructions on a computer readable medium and executed on a general-purpose processor. Steps 410-420 of process 400 concern initial setup steps. In step 410, the owner generates an initial key and a windowed key rotation element. The windowed key rotation element may be a random RSA public key "e", as discussed herein. The initial key may be a random number. In step 420, the initial key and the windowed key rotation element are provided to the initial users via any convenient secure method.

Steps 430-450 of process 400 concern revoking a user. In step 430, the owner generates a new version of the windowed key rotation element $(e_{i+1})$ from a previous version of the windowed key rotation element $(e_i)$. A technique for accomplishing this is described hereinabove in Equation 1, in which a one-way function is applied to the previous version of the windowed key rotation element $(e_i)$, along with other steps.

In step 440, the owner determines a new cryptographic key $(K_{i+1})$, based on a previous cryptographic key $(K_i)$ and the new version of the windowed key rotation element $(e_{i+1})$ generated in step 430. A technique for accomplishing this is described hereinabove in Equations 2 and 3.

In step 450, the new cryptographic key $(K_{i+1})$ is provided to the non-revoked users. The new cryptographic key may be provided by a secure method.

Step 460 concerns adding a new user. In step 460, the owner provides the current key $(K_i)$ and a windowed key rotation element to the new user. For example, using the notation illustrated in FIG. 2, the owner may provide a windowed key rotation element $(e_{i+1})$. Thus, if the key the user is first given is $K_1$, the user will be given $e_2$, such that the user cannot determine any key earlier than $K_1$. The new user is able to determine later versions of the windowed key rotation element without additional information from the owner. However, the user cannot determine any windowed key rotation elements that were the current windowed key rotation element prior to the time the new user joined.

Steps 470-480 concern a user determining a previous version of a cryptographic key. In step 470, the user determines later versions of the windowed key rotation element from the version provided to the user when the user joined. For example, referring to FIG. 2, the user may wish to determine cryptographic key $K_3$. If the user has cryptographic key $K_4$, the user can determine cryptographic key $K_3$ provided the user has windowed key rotation element $(e_4)$ using the notation in FIG. 2. If the user was initially provided windowed key rotation element $(e_2)$, the user can determine windowed key rotation element $(e_4)$, such that cryptographic key $(K_3)$ may be determined. As discussed herein, the user is not able to easily determine any earlier versions of the windowed key rotation element than the one provided to the user.

In step 480, the user applies one of the windowed key rotation elements to a cryptographic key to determine a previous version of the cryptographic key. FIG. 2 illustrates one technique for accomplishing this, in which a cryptographic key $(K_{i+1})$ is raised to the power of $(e_{i+1})$ to generate $(K_i)$.

In another embodiment in accordance with the present invention, the cryptographic key updates are provided non-interactively. This embodiment uses a key rotation catalyst that may be used by an owner to generate cryptographic file key updates and by a user to determine previous cryptographic file keys. The key rotation catalyst will be described in greater detail below. In the present embodiment, initially, the owner may generate various items to setup the cryptographic key management. For example, the owner may generate a public key, a private key, and an initial cryptographic file key. To generate the owner's public and private keys, the owner may select safe Sophie-Germain primes p, q, $p_1$, $p_2$, where p|q−1 and the minimum $(|\phi(p_1\ p_2)|, |q|)=2^s$, where s is the security parameter and $\phi(p_1\ p_2)=(p_1-1)(p_2-1)$. A value "N" may be set to "$p_1 p_2$", the RSA (Rivest-Shamir-Adleman) modulus. According to the present embodiment, a value "g" may be established to be a generator of $Z_q$, such that the DDH (Decisional Diffie-Hellman) assumption holds for $Z_q$ and "g". A random RSA public key "e" and a private key "d" may be generated according to a conventional fashion where ed≡1 mod $\phi(N)$, and gcd(e, $\phi(N)$)=1. However, the present invention is not limited to this method of calculating the owner's public and private keys. More generally, any asymmetric cryptosystem may be used. Further, rather than using public and private keys, a secure one-way hash function may be used, in which case the owner pre-computes the hash sequence in advance.

In the present embodiment, the generation of the initial cryptographic file key comprises generating multiple items, one of which may be a random polynomial. For a system allowing t−1 simultaneous revocations, the file owner may generate a random polynomial, P(x), of degree t over $Z_q$. To generate the initial cryptographic file key, the owner may calculate the value of the polynomial at zero, P(0), and a random number $r_0$ to be used as an exponent factor. However, the polynomial may be evaluated at a point other than zero.

The initial cryptographic file key, $K_0$, may be set according to Equation 6, with "g" being the generator discussed above.

$$K_0 = g^{r_0 P(0)} \bmod q \qquad \text{Equation 6:}$$

The owner may also generate a random number, $\gamma_0$, to be used as the initial key rotation catalyst. The key rotation catalyst does not have to be used in creating the initial cryptographic key, but it is used to generate cryptographic key updates.

From time to time, the owner generates a new cryptographic key, based on a previous cryptographic key. For example, when a user is revoked, a new key may be generated so that the user is prevented from having any further access. However, files encrypted with old keys may still be decryptable by the revoked user, at least until those files are encrypted with a new version of the key. The owner may generate a new cryptographic file key as follows. The owner may generate a new exponent factor ($r_i$) and a new key rotation catalyst ($\gamma_i$) according to Equations 7 and 8.

$$\text{Equation 7:} \qquad r_i = \frac{r_{i-1}}{\gamma_{i-1}} \bmod q$$

$$\text{Equation 8:} \qquad \gamma_i = \frac{1}{\gamma_{i-1}^{d_i}} \bmod n$$

Equation 8 may be described as performing an encryption of the previous key rotation catalyst with the owner's private key, "d". This may be an RSA encryption, but the present invention is not so limited. More generally, the new key rotation catalyst is generated by applying a one-way function to the old key rotation catalyst. In this fashion, it is easy for users (or others) to obtain previous versions only of they have a later version of the key rotation catalyst. Thus, instead of the encryption used in Equation 8, a secure hash could be used. Further, any other asymmetric cryptosystem could be used to generate the new key rotation catalyst from the previous key rotation catalyst. Equation 7 may be described as dividing the previous exponent factor by the previous key rotation catalyst. However, the present invention is not limited to this technique of generating the new exponent factor, $r_i$.

The new cryptographic file key, $K_i$, is given by Equation 9, where "g" is the generator and $r_i$ is taken from Equation 7.

$$K_i = g^{r_i P(0)} \bmod q \qquad \text{Equation 9:}$$

Further, the owner generates a user numeric identity, "u", and a secret share P(u) for each valid user. The numeric identity and the secret share may be sent securely to a given user, who uses it in generating the new cryptographic key non-interactively.

The owner may revoke a user by generating a new cryptographic file key and publishing information that allows retained users to generate the new cryptographic key, but does not allow the revoked user to generate the new cryptographic key. For example, the owner may publish a version of the revoked user's secret share and the key rotation catalyst, $\gamma_{i-1}$. The version of the revoked user's secret share may be $(u, g^{r_i P(u)})$ where "u" is the revoked user's numeric identity, "g" is a generator, $r_i$ is an exponent factor, and P(u) is the revoked user's secret share that was provided to the user. The owner may also publish the value of $g^{r_i}$, which is based on the new key, as seen in Equation 9.

A non-revoked user is able to generate the new cryptographic key using $g^{r_i}$, the version of the revoked user's secret share, the retained user's own secret share, and the current cryptographic key. The user may also need to have other public shares to generate the new cryptographic key, as discussed below. However, the revoked user cannot generate the new cryptographic key because the revoked user lacks sufficient information. For example, his published private share information is redundant to him.

A non-revoked user may generate the new cryptographic file key with polynomial interpolation, such as LaGrange polynomial interpolation. For example, the new group key is $K_i = g^{r_i P(0)}$. Since $P(0) = \Sigma_{i=0}^t \lambda_i P(u_i)$, where $$\lambda_i = \prod_{j \neq i} \frac{u_j}{u_j - u_i},$$

it follows that $K_i = g^{r_i \Sigma_{i=0}^t \lambda_i P(u_i)} = \prod_{i=0}^t g^{r_i \lambda_i P(u_i)}$. In the event the polynomial is not evaluated at zero, an appropriate variant of the formulas may be used.

Embodiments of the present invention provide security for up to "t−1" revocations when using a random polynomial of degree "t". For example, in order for the non-revoked users to be able to generate the new key non-interactively, the owner may publish up to "t−1" shares of information. Each user then utilizes his or her own private share as the final bit of information needed to generate the new key via interpolation. The published information can include a mix of dummy shares and a version of the revoked user's private shares. The dummy shares may be of the form $g^{r_i P(y)}$ and the version of the revoked user's private share may be of the form $g^{r_i P(u)}$, where P(u) is the revoked user's private share.

To keep revoked users revoked, the owner may continue to use the revoked users' private shares in the public share information. This prevents revoked users from colluding. After "t" revocations, the owner starts over with a new initial key.

Embodiments of the present invention can be used to recover intermediate keys lost due to a lossy network. Thus, even if one or more versions of the published information are not received by a user, that user can reconstruct the missed information. For example, a key rotation catalyst may fail to be properly posted on the bulletin board or may be removed from the bulletin board before the user retrieves it. As long as the user gets a future key rotation catalyst, the user can work backwards to recreate a limited number of key rotation catalysts, in this embodiment.

Figure 5:
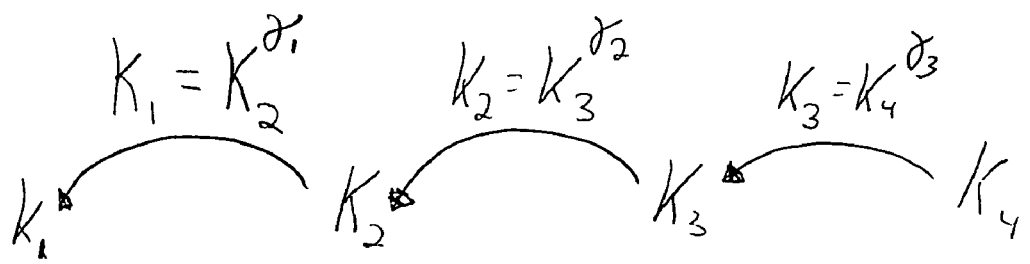
FIG. 5 illustrates an exemplary diagram of windowed backward key generation with non-interactive key distribution in accordance with an embodiment of the present invention.

FIG. 5 illustrates an exemplary diagram 500 of a windowed recursive key rotation process in accordance with an embodiment of the present invention. As shown in FIG. 5, the user may generate cryptographic key, $K_1$, from $K_2$ by the relationship $K_1 = K_2^{\gamma_1}$. Similarly, cryptographic key, $K_2$, may be generated by the recursive relationship of $K_2 = K_1^{\gamma_1}$. The previous assumes that the user has the key rotation catalyst $\gamma$. Embodiments in accordance with the present invention encrypt the key rotation catalyst $\gamma$ with the windowed key rotation element "e" to limit how far back the user is allowed to go. Thus, the user can compute according to the formula in Equation 10, where $\gamma-1$ is the previous key rotation catalyst.

$$K_{i-1} = K_i^{\gamma-1} \bmod N \qquad \text{Equation 10:}$$

In a more general form, the owner may calculate cryptographic keys that are more than one generation old in a single operation, as shown in Table 1, in which "e" is the windowed key rotation element.

TABLE 1

$$K_2 = K_3^{\gamma_2} \quad \mod N$$

$$K_1 = K_3^{\gamma_2 \gamma_1} \quad \mod N$$

$$K_0 = K_3^{\gamma_2 \gamma_1 \gamma_0} \quad \mod N$$

$$= K_3^{\gamma_2 \gamma_2^{e_1} \gamma_2^{e_1 e_0}} \quad \mod N$$

$$K_{i-w} = K_i^{\gamma_{i-1} \gamma_{i-2} \cdots \gamma_{i-w}} \quad \mod N$$

$$= K_i^{\gamma_{i-1} \gamma_{i-1}^{e_{i-2}} \cdots \gamma_{i-1}^{e_{i-2} e_{i-3} \cdots e_{i-w}}} \quad \mod N$$

$$= K_i^{\gamma_{i-1}^{1+e_{i-2}+\cdots+e_{i-w}}} \quad \mod N$$

Figure 6:
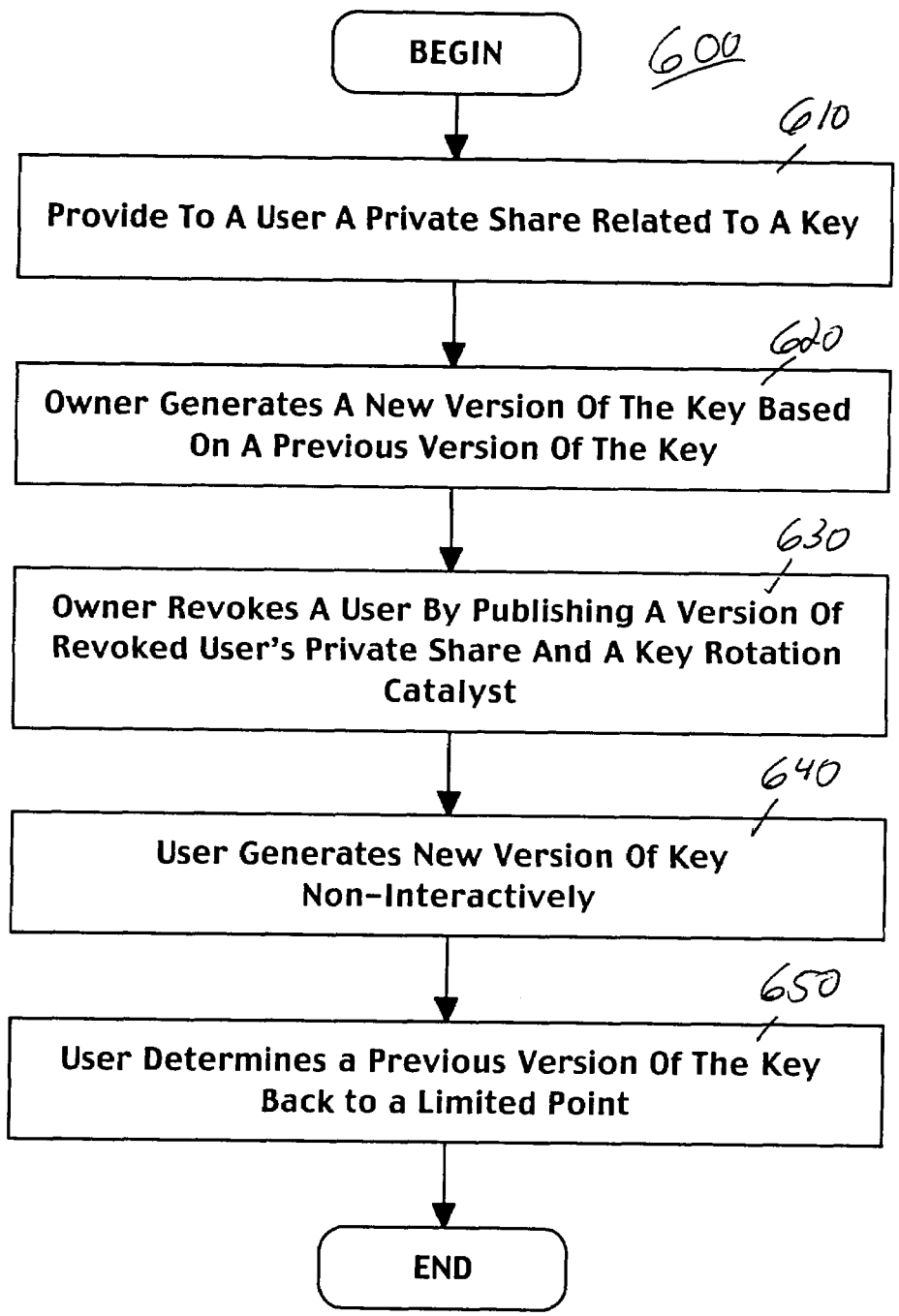
FIG. 6 illustrates steps of a process of windowed backward key generation with non-interactive key distribution in accordance with an embodiment of the present invention.

An embodiment of the present invention is a method of windowed key rotation featuring non-interactive cryptographic key updates. Steps of process 600 of FIG. 6 may be stored as instructions on a computer readable medium and executed on a general-purpose processor. In step 610, a user is provided a private share related to a cryptographic key. For example, the private share may be the value of a polynomial evaluated at a point, P(u). That point may be the user's numeric identity (u), which may also be provided to the user. This information may be provided securely.

In step 620, a new version of a cryptographic file key is generated, based on a previous version of the cryptographic file key. For example, an owner may perform an encryption of a previous version of a key rotation catalyst to generate a new key rotation catalyst, γ. However, any asymmetric cryptosystem may be used. Then, a new exponent factor, $r_i$, may be calculated by dividing the previous exponent factor, $r_{i-1}$, by the previous key rotation catalyst. The new cryptographic key may be formed by raising a generator, "g", to a power that comprises the new exponent factor, $r_i$, and a randomly generated polynomial evaluated at a point (e.g., zero).

In step 630, a key rotation catalyst and a version of a revoked user's private share are published. The version of the revoked user's private share may comprise the revoked user's numeric identity, "u", and a value of the generator, "g", raised to a power that comprises the new exponent factor, $r_i$, and the revoked user's private share, P(u). The owner may also publish dummy shares so as to get a total of t shares in each publication. A generator, "g", raised to the $r_i$ may be published as well.

In step 640, a user non-interactively generates the new version of the cryptographic file key. This step may be performed by someone other than a user as well. For example, the user accesses the key rotation catalyst, γ, and the version of a revoked user's private share, which were published in step 630. The user may perform a decryption of the key rotation catalyst with the owner's public key, "e", also referred to herein as the windowed key exponent. This provides the user with the previous version of the key rotation catalyst. In the present embodiment, the user determines the new cryptographic key non-interactively by the methods described above herein. For example, the user interpolates using the various shares.

In step 650, the user generates a previous version of the cryptographic file key. The user may accomplish this by raising the value of the new cryptographic key to the power given by the value of a previous key rotation catalyst, γ. Equation 10 defines such a process. However, the user is limited as to how far back the user can determine the key rotation catalyst, γ. The user can rotate forward the windowed key exponent (e). However, the user cannot rotate backward the windowed key exponent (e). This limits how far back the user can decrypt the key rotation catalyst, γ. Thus, the user is limited as to how far back the user is able to determine the cryptographic key (K).

Figure 7:
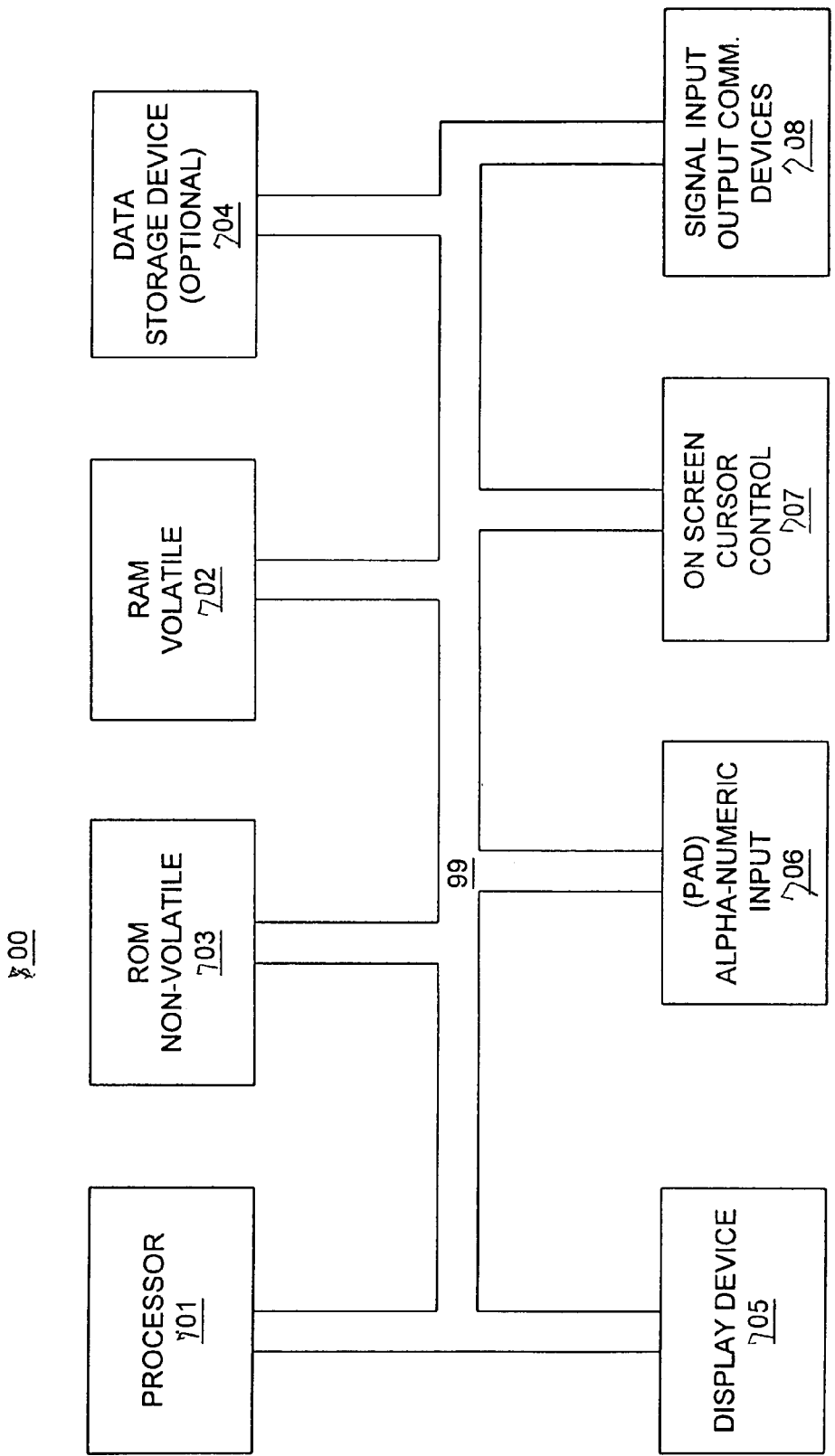
FIG. 7 is an exemplary computer system that may serve as a platform for embodiments of the present invention.

With reference now to FIG. 7, portions of embodiments of the present invention are comprised of computer-readable and computer-executable instructions that reside, for example, in computer-usable media of a computer system. For example, computer system 700 may be used as a platform for security module 115. FIG. 7 illustrates an exemplary computer system 700 used to perform a method in accordance with embodiments of the present invention. It is appreciated that system 700 of FIG. 7 is exemplary only in that embodiments of the present invention can operate within a number of different computer systems including general purpose networked computer systems, embedded computer systems, and stand alone computer systems. Additionally, computer system 700 of FIG. 7 is well adapted to having computer readable media such as, for example, a floppy disk, a compact disc, and the like coupled thereto. Such computer readable media is not shown coupled to computer system 700 in FIG. 7 for purposes of clarity.

System 700 of FIG. 7 includes an address/data bus 99 for communicating information, and a central processor unit 701 coupled to bus 99 for processing information and instructions. System 700 also includes data storage features such as a computer usable volatile memory 702, e.g., random access memory (RAM), coupled to bus 99 for storing information and instructions for central processor unit 701, computer usable non-volatile memory 703, e.g. read only memory (ROM), coupled to bus 99 for storing static information and instructions for the central processor unit 701, and an optional data storage unit 704 (e.g., a magnetic or optical disk and disk drive) coupled to bus 99 for storing information and instructions.

With reference still to FIG. 7, system 700 of embodiments of the present invention also includes an optional alphanumeric input device 706 including alphanumeric and function keys is coupled to bus 99 for communicating information and command selections to central processor unit 701. System 700 also optionally includes a cursor control device 707 coupled to bus 99 for communicating user input information and command selections to central processor unit 701. System 700 of the present embodiment also includes an optional display device 705 coupled to bus 99 for displaying information. Signal input/output communication device(s) 708 coupled to bus 99 is connected to a network (e.g., network 120) and controls the flow of information over the network.

While the present invention has been described in particular embodiments, it should be appreciated that the present invention should not be construed as limited by such embodiments, but rather construed according to the below claims.

We claim:

1. A method of windowed backward key generation, comprising:

providing, by a computer system, information to a user that allows determining a limited number of previous keys in a series of keys from a later key in the series;

generating, by the computer system, a key in the series, based at least in part on said information provided to said user;

providing, by the computer system, said generated key in the series to the user to allow a determination of at least one key in the limited number of previous keys in the series by applying said information to said generated key in the series.

2. The method of claim 1, wherein providing the information comprises providing a key rotation element that is forward rotatable by said user but is not backward rotatable.

3. The method of claim 1, wherein providing the information comprises providing to the user a key rotation exponent that is used to determine a previous key in the series from a later key in the series by exponentiating said later key by said key rotation exponent.

4. The method of claim 2, further comprising:
generating, from the key rotation element, a new key rotation element;
generating a new key based, in part, on said new key rotation element; and
distributing said new key to non-revoked users.

5. The method of claim 1, wherein providing the information comprises providing a secret share and a key rotation catalyst to said user, wherein said secret share and said key rotation catalyst allow said user to generate a next key in the series provided sufficient public information is available.

6. The method of claim 5, further comprising:
publishing at least one public share, wherein the next key in the series is determinable based on the key rotation catalyst, the secret share, and the at least one public share.

7. The method of claim 5, further comprising revoking a user by publishing a version of the revoked user's secret share.

8. A method of windowed backward key rotation, comprising:
providing, by a computer system, to a user a key rotation element and a key ($K_i$), wherein later versions of the key rotation element are determinable using a predetermined function but previous versions of the key rotation element are not determinable using the predetermined function;
generating, by the computer system, a later version of the key ($K_{i+n}$) based on a later version of the key rotation element, wherein "n" is a positive integer;
providing, by the computer system, to the user the later version of the key ($K_{i+n}$) to allow a determination of
a particular version of the key from ($K_i$-$K_{i+n-1}$), inclusive, by applying one of the later versions of the key rotation element to a given version of the key from ($K_{i+1}$-$K_{i+n}$), inclusive, wherein the given version of the key is a later version than the particular version of the key.

9. The method of claim 8, further comprising:
determining a later version of said key rotation element from said provided key rotation element.

10. The method of claim 9, wherein
determining the version of the key $K_{i+n-1}$ is performed by applying the one of the later versions of the key rotation element to the version of the key $K_{i+n}$.

11. The method of claim 8, further comprising:
generating a new key rotation element;
generating a new key based, in part, on said new key rotation element; and
distributing said new key to non-revoked users.

12. The method of claim 8, wherein the predetermined function is a one-way hash function.

13. A method of windowed backward file key generation, comprising:
generating, by a computer system, a file key;
generating, by the computer system, a key rotation exponent, wherein said key rotation exponent allows previous versions of the file key to be determined, wherein a first previous version of the file key is computable from the generated file key and the generated key rotation exponent, and a second previous version of the file key earlier than the first version is computable from the first previous version of the key file and a previous version of the key rotation exponent.

14. The method of claim 13, further comprising:
joining a new user by distributing said generated file key and said generated key rotation exponent to said new user.

15. The method of claim 13, further comprising:
generating a new key rotation exponent;
generating a new file key based, in part, on said new key rotation exponent; and
distributing said new file key to non-revoked users.

16. The method of claim 13, further comprising:
generating a key rotation catalyst; and
providing a secret share and said key rotation catalyst, wherein said secret share and said key rotation catalyst allow generation of a new version of the file key provided sufficient public information is available.

17. The method of claim 16, further comprising:
publishing a public share, wherein users are able to determine a new version of the file key using their own secret shares, the public shares, the key rotation catalyst, and a previous file key.

18. The method of claim 16, further comprising:
generating a new key rotation catalyst;
publishing said new key rotation catalyst;
generating a new file key based, in part, on said new key rotation catalyst; and
publishing a revoked user's private share.

\* \* \* \* \*

UNITED STATES PATENT AND TRADEMARK OFFICE
CERTIFICATE OF CORRECTION

PATENT NO. : 7,697,690 B2 Page 1 of 1
APPLICATION NO. : 10/624403
DATED : April 13, 2010
INVENTOR(S) : Kevin E. Fu et al.

It is certified that error appears in the above-identified patent and that said Letters Patent is hereby corrected as shown below:

In column 1, line 2, below Title, insert -- RELATED U.S. APPLICATION DATA --.

Signed and Sealed this

Seventeenth Day of August, 2010

David J. Kappos
*Director of the United States Patent and Trademark Office*